(12) United States Patent
Esdel

(10) Patent No.: US 10,682,923 B2
(45) Date of Patent: Jun. 16, 2020

(54) ON-BOARD CHARGING SYSTEM FOR ELECTRIC VEHICLES

(71) Applicant: Benjamin Robert Esdel, Bronx, NY (US)

(72) Inventor: Benjamin Robert Esdel, Bronx, NY (US)

(73) Assignee: LECTROTECH SYSTEM INC., Bronx, NY (US)

(*) Notice: Subject to any disclaimer, the term of this patent is extended or adjusted under 35 U.S.C. 154(b) by 0 days.

(21) Appl. No.: 16/509,972

(22) Filed: Jul. 12, 2019

(65) Prior Publication Data

US 2020/0016990 A1 Jan. 16, 2020

Related U.S. Application Data

(60) Provisional application No. 62/697,066, filed on Jul. 12, 2018.

(51) Int. Cl.

| | |
|---|---|
| *B60L 53/20* | (2019.01) |
| *B60L 58/12* | (2019.01) |
| *B60L 50/60* | (2019.01) |
| *H02J 7/14* | (2006.01) |
| *B60L 58/18* | (2019.01) |

(52) U.S. Cl.
CPC ............ *B60L 53/20* (2019.02); *B60L 50/66* (2019.02); *B60L 58/12* (2019.02); *B60L 58/18* (2019.02); *H02J 7/14* (2013.01); *B60L 2210/40* (2013.01); *B60Y 2200/91* (2013.01); *B60Y 2300/91* (2013.01)

(58) Field of Classification Search
CPC .. B60L 58/18; B60Y 2200/91; B60Y 2300/91
See application file for complete search history.

(56) References Cited

U.S. PATENT DOCUMENTS

| | | | |
|---|---|---|---|
| 4,095,665 A | 6/1978 | Armfield | |
| 4,242,617 A | 12/1980 | Jennings | |
| 4,597,463 A | 7/1986 | Barnard | |
| 5,287,772 A | 2/1994 | Aoki et al. | |
| 5,291,960 A | 3/1994 | Brandenburg et al. | |
| 5,403,244 A | 4/1995 | Tankersley et al. | |
| 5,689,174 A * | 11/1997 | Pacheco, Sr. | B60K 6/26 180/65.1 |
| 5,994,789 A * | 11/1999 | Ochiai | H02J 7/345 307/10.1 |
| 6,082,476 A * | 7/2000 | Stulbach | B60K 25/08 180/65.1 |
| 6,592,484 B1 | 7/2003 | Tsai et al. | |

(Continued)

*Primary Examiner* — Brian L Swenson
(74) *Attorney, Agent, or Firm* — Dunlap Bennett & Ludwig PLLC; Brendan E. Squire

(57) ABSTRACT

An on-board charging system for electric vehicles provides a source of electric charging power to even when the electric vehicle is not in motion. The charging system includes a free rolling axle supporting at least one driven ground wheel to power an electric generator. An electric charge is produced by the generator when driven by the free rolling axle and is stored in a plant battery. An inverter and a charger are selectively coupled to a battery pack that provides the motive power to the electric vehicle. A controller selectively charges the battery pack when it detects a predetermined charge state of the battery pack.

9 Claims, 1 Drawing Sheet

(56) References Cited

U.S. PATENT DOCUMENTS

| | | |
|---|---|---|
| 6,734,645 B2 | 5/2004 | Auerbach |
| 6,886,647 B1 | 5/2005 | Gotta |
| 7,497,285 B1 | 3/2009 | Radev |
| 7,779,943 B2 | 8/2010 | Seidel et al. |
| 8,439,140 B1 * | 5/2013 | Amortegui ............ B60K 25/08 |
| | | 180/65.51 |
| 8,485,294 B2 | 7/2013 | Palmer |
| 8,567,541 B2 | 10/2013 | Wenger et al. |
| 9,027,682 B2 | 5/2015 | Lambert |
| 9,120,480 B2 | 9/2015 | Kiuchi |
| 9,751,424 B2 | 9/2017 | Crombez |
| 2003/0122512 A1 * | 7/2003 | Auerbach ................ B60L 7/16 |
| | | 318/139 |
| 2006/0272863 A1 | 12/2006 | Donahue |
| 2010/0006351 A1 | 1/2010 | Howard |
| 2010/0181126 A1 | 7/2010 | Penrod |
| 2012/0255798 A1 * | 10/2012 | Palmer .................. B60K 17/04 |
| | | 180/65.6 |
| 2012/0323421 A1 * | 12/2012 | Avery .................... B60L 58/18 |
| | | 701/22 |
| 2013/0133180 A1 | 5/2013 | Neis |
| 2013/0138282 A1 | 5/2013 | Shin et al. |
| 2014/0015489 A1 | 1/2014 | Pardue |
| 2014/0228167 A1 | 8/2014 | Frank et al. |
| 2015/0120106 A1 | 4/2015 | Yu et al. |
| 2015/0210152 A1 * | 7/2015 | Arkus ................ B60L 11/1809 |
| | | 180/65.245 |
| 2016/0052505 A1 * | 2/2016 | Zhou ........................ B60L 7/14 |
| | | 701/22 |
| 2018/0141537 A1 * | 5/2018 | Schobe ................ B60W 10/06 |

* cited by examiner

ON-BOARD CHARGING SYSTEM FOR ELECTRIC VEHICLES

CROSS-REFERENCE TO RELATED APPLICATION

This application claims the benefit of priority of U.S. Provisional application No. 62/697,066, filed Jul. 12, 2018, the contents of which are herein incorporated by reference.

BACKGROUND OF THE INVENTION

The present invention relates to electrically powered vehicles and, more particularly, to on-board charging systems for electrically powered vehicles.

Electric vehicles are typically powered by a bank of batteries carried on-board the vehicle. The electrical power stored in the batteries is used to power an electric drive motor to propel the vehicle.

In a hybrid vehicle, an internal combustion engine (ICE) is provided to either provide a charging source for the batteries as they are depleted or to provide a motive power to the vehicle when the charge has been depleted or the electric motor is insufficient to provide the requisite motive power to the vehicle.

In electric vehicles without an ICE, the range of the electric vehicle is limited by the efficiency of the drive system and the capacity of the batteries carried on-board the vehicle. Various solutions are provided for on-board charging of the batteries. Regenerative braking is one solution in which during a braking or deceleration sequence the kinetic energy of the moving vehicle is used to drive a generator to recharge the batteries. Other systems include coupling of a generator to a wheel that is driven by the vehicle when the vehicle is in motion. However, these solutions require that the vehicle be in motion to provide recharging of the batteries but do not provide a recharging source when the vehicle is stationary.

As can be seen, there is a need for an on-board charging system that can recharge a drive battery for an electric vehicle when the vehicle is stationary.

SUMMARY OF THE INVENTION

In one aspect of the present invention, an on-board charging system for an electric vehicle is disclosed. The on-board charging system includes a free rolling axle adapted to support at least one driven ground wheel of the electric vehicle. A gearbox has an input driven by the free rolling axle and an output. A low speed electric generator is coupled to the output. The low speed electric generator produces an electric charge when driven by the at least one driven ground wheel. A plant battery is operatively connected to the generator store the electric charge. An inverter operatively connected to the plant battery and a charger is configured to charge a battery pack of the electric vehicle. A controller is configured to monitor a charge state of the battery pack and selectively charge the battery pack with an electric charge from the charger.

In some embodiments, the on-board charging system includes a first battery pack and a second battery pack. The controller is configured to alternately power an electric motor providing a motive force to the electric vehicle from one of the first battery pack and the second battery pack. The controller is also configured to place the other of the first battery pack and the second battery pack in a standby mode.

In other embodiments, a charging switch is provided and the controller is configured to activate the charging switch to direct the charger to charge the battery pack placed in the standby mode. In preferred embodiments, the controller activates the charging switch when the charge state of the battery pack in the standby mode is below a predetermined threshold.

In other aspects of the invention, an on-board charging system for an electric vehicle includes a free rolling axle adapted to support at least one driven ground wheel of the electric vehicle. A gearbox has an input driven by the free rolling axle and an output. A low speed electric generator is coupled to the output, such that the low speed electric generator produces an electric charge when driven by the free rolling axle. A plant battery is operatively connected to store the electric charge. An inverter is operatively connected to the plant battery. A controller is configured to monitor a charge state of a first battery pack and a second battery pack of the electric vehicle. The controller is configured to activate a transfer switch to alternately power an electric motor providing a motive force to the electric vehicle from one of the first battery pack and the second battery pack based on the charge state. The transfer switch may also be configured to place the other of the first battery pack and the second battery pack in a standby mode.

In some embodiments, a charger is operatively connected to an output of the inverter. The charger is configured to selectively charge one of the first battery pack and the second battery pack.

In other embodiments, a charging switch is provided and the controller is configured to activate the charging switch to direct the charger to charge the battery pack placed in the standby mode. In yet other embodiments, the controller activates the charging switch based on the charge state of the battery pack placed in the standby mode. The controller may be configured to place the other of the first battery pack and the second battery pack in a standby mode.

In yet other embodiments, a charger is operatively connected to an output of the inverter. The charger is configured to selectively charge one of the first battery pack and the second battery pack. The system may also include a charging switch and the controller is configured to activate the charging switch to direct the charger to charge the battery pack placed in the standby mode. The charging switch is activated based on the charge state of the battery pack placed in the standby mode.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an on-board charging system for an electric vehicle that charges a main battery bank when the electric vehicle is stationary.

Figure 1:
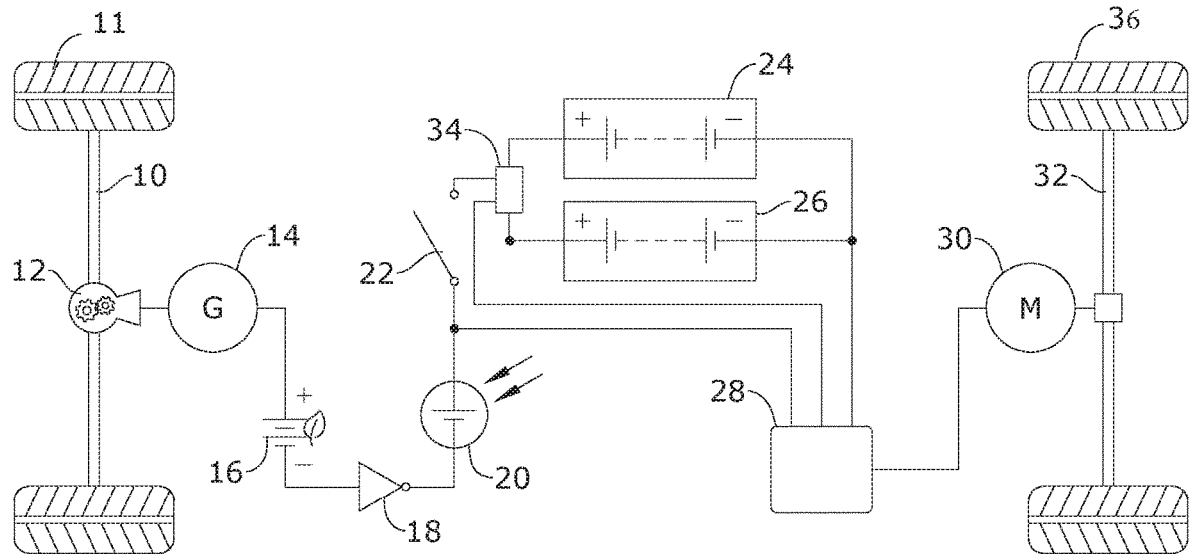
FIG. 1 is a schematic view of an on-board charging system for electric vehicles.
Figure 2:
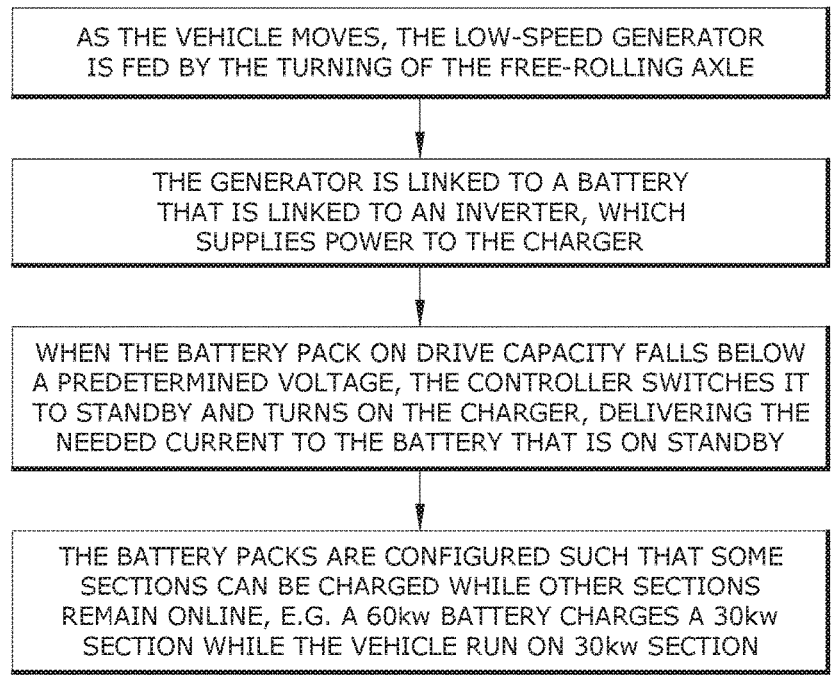
FIG. 2 is a flow chart illustrating the on-board charging system.

As seen in reference to the drawings of FIG. 1, an on-board charging system for an electric vehicle according to aspects of the present invention is shown. The electric vehicle includes a free rolling axle 10 coupled to at least one driven ground wheel 11 of the electric vehicle. The free rolling axle 10 is connected to a gearbox 12. The gear box 12 is constructed and configured with a ratio that would create a mechanical advantage to the device coupled to it as it is driven by the rolling axle 10. The axle rolls free with the vehicle lateral motion.

An output of the gearbox is connected to a low-speed electrical generator 14. The low speed electric generator 14 is designed to produce the electric power needed to charge a plant battery 16 as the vehicle moves, and does so while spinning at a very low rpm, such as between about 100-500 rpm. An electrical output of the low-speed generator 14 is carried to the plant battery 16 where it is stored. The low speed electric generator 14 links with an inverter 18 by way of the plant battery 16 that serve as a bridge and provides continuity of stable power between the components.

The plant battery 16 selectively powers an inverter 18, which in turn is coupled to a charger 20. A charging switch 22 that is normally in an open, non-conductive state, is controlled by a control module 28. The inverter 18 links with the charger 20. The charger 20 is configured to deliver the high wattage that is needed to recharge a battery pack 24, 26.

The control module 28 is the command center for the system. The control module 28 monitors the battery and controls the action of the other electrical components. When the battery capacity falls below a predetermined voltage the control module 28 directs the delivery of the current needed to charge the battery 24, 26 selected by the control module 28.

The electric vehicle also includes a first battery pack 24 and a second battery pack 26 that are selectively controlled by the control module 28. One of the first battery pack 24 and the second battery pack 26 alternately power an electric motor 30, an output of which is transferred to a drive axle 32 and at least one drive wheel 36 to propel the electric vehicle. A transfer switch 34 alternately switches between the first battery pack 24 and the second battery pack 26 to power the electric motor 30. The transfer switch 34 places the other of the first and the second battery pack 26 a standby mode.

As will be appreciated the first battery pack 24 and the second battery pack 26 may be two sections of one battery. Each section may be independently controlled from the other sections of the respective battery. By way of non limiting example, the first battery pack 24 may have a rating of 30 kW as well as battery pack 26 being a 30 kW section. In this instance, one of the 30 kW sections may power the motor 30, while the other 30 kW section is in a standby mode and able to receive a charge.

The control module 28 monitors a drive capacity of each of the first battery pack 24 and the second battery pack 26. When the control module 28 detects that the drive capacity of the first battery pack 24 has been depleted below a predetermined threshold, the control module 28 activates the transfer switch 34 which switches the second battery pack 26 to an active state to power the electric motor 30 and the first battery pack 24 is switched to the standby mode.

When one of the first battery pack 24 or the second battery pack 26 is in the standby mode and in a specified depleted condition, the control module 28 activates the charging switch 22 at which time the plant battery 16 output is used to power the inverter 18 and the charger 20 to replenish the battery that is in the standby mode. With this configuration, the plant battery 16 is available to charge the battery in the standby mode, regardless of whether the driven wheel 11 is in motion or is stationary.

The component capacities of the system are tailored to the configuration presented in the electric vehicle. That is the power in battery wattage, the weight of the vehicle and the electric motor 30 capacity in wattage. The inverter could be substituted with a bridge rectifier, when the generator 14 is an AC generator.

It should be understood, of course, that the foregoing relates to exemplary embodiments of the invention and that modifications may be made without departing from the spirit and scope of the invention as set forth in the following claims.

What is claimed is:

1. An on-board charging system for an electric vehicle comprising:
a free rolling axle adapted to support at least one driven ground wheel of the electric vehicle;
a gearbox having an input driven by the free rolling axle and an output;
a low speed electric generator coupled to the output, the low speed electric generator producing an electric charge when driven by the at least one driven ground wheel;
a plant battery operatively connected to the low speed electric generator to store the electric charge;
an inverter operatively connected to the plant battery and powered by the stored electric charge,
a charger configured to selectively charge a battery pack of the electric vehicle, the charger powered by an output of the inverter;
an electric motor powered by the battery pack, an output of the electric motor is transferred to a drive axle and at least one drive wheel connected to the drive axle to propel the electric vehicle; and
a controller configured to monitor a charge state of the battery pack and selectively charge the battery pack with an electric charge from the charger.

2. The on-board charging system of claim 1, further comprising:
a first battery pack and a second battery pack, wherein the controller is configured to alternately power an electric motor providing a motive force to the electric vehicle from one of the first battery pack and the second battery pack.

3. The on-board charging system of claim 2, wherein the controller is configured to place the other of the first battery pack and the second battery pack in a standby mode.

4. The on-board charging system of claim 3, further comprising:
a charging switch, wherein the controller is configured to activate the charging switch to direct the charger to charge the battery pack placed in the standby mode.

5. The on-board charging system of claim 4, wherein the controller activates the charging switch when the charge state of the battery pack in the standby mode is below a predetermined threshold.

6. An on-board charging system for an electric vehicle comprising:
a free rolling axle adapted to support at least one driven ground wheel of the electric vehicle;

a gearbox having an input driven by the free rolling axle and an output;

a low speed electric generator coupled to the output, the low speed electric generator producing an electric charge when driven by the free rolling axle;

a plant battery operatively connected to store the electric charge;

an inverter powered by the electric charge of the plant battery, a charger operatively connected to an output of the inverter, the charger configured to selectively charge one of the first battery pack and the second battery pack, a controller configured to monitor a charge state of a first battery pack and a second battery pack of the electric vehicle; and a transfer switch, wherein the controller is configured to activate the transfer switch to alternately power an electric motor providing a motive force to the electric vehicle from one of the first battery pack and the second battery pack based on the charge state.

7. The on-board charging system of claim 6, wherein the transfer switch is configured to place the other of the first battery pack and the second battery pack in a standby mode.

8. The on-board charging system of claim 7, further comprising a charging switch, wherein the controller is configured to activate the charging switch to direct the charger to charge the battery pack placed in the standby mode.

9. The on-board charging system of claim 8, wherein the controller activates the charging switch based on the charge state of the battery pack placed in the standby mode.

* * * * *